United States Patent [19]
Witt

[11] Patent Number: 4,829,876
[45] Date of Patent: May 16, 1989

[54] AIRCRAFT MISSILE LAUNCHER SWAY BRACE APPARATUS

[75] Inventor: David A. Witt, Rowlett, Tex.

[73] Assignee: Varo, Inc., Garland, Tex.

[21] Appl. No.: 157,365

[22] Filed: Feb. 17, 1988

Related U.S. Application Data

[63] Continuation-in-part of Ser. No. 017,777, Feb. 20, 1987, Pat. No. 4,736,669.

[51] Int. Cl.$^4$ ................................................ F41F 7/00
[52] U.S. Cl. ...................................... 89/1.53; 89/1.819
[58] Field of Search .................... 89/1.53, 1.58, 1.819, 89/1.8

[56] References Cited

U.S. PATENT DOCUMENTS

| | | | |
|---|---|---|---|
| 4,155,286 | 5/1979 | Mihm | 89/1.819 |
| 4,233,883 | 11/1980 | Miko | 89/1.53 |
| 4,412,475 | 11/1983 | Hornby | 89/1.53 |
| 4,660,456 | 4/1987 | Griffin et al. | 89/1.819 |

Primary Examiner—David H. Brown
Attorney, Agent, or Firm—Jerry W. Mills

[57] ABSTRACT

A saddle sway brace (90) having a channeled planar plate (94) engageable on a missile launcher platform surface (56). Angled planar plates (100, 102) provide load support for aircraft outrigger equipment. A webbed reenforcing network (110, 112) is engageable with notches (122, 124) in the missile launcher for load support and stability.

10 Claims, 2 Drawing Sheets

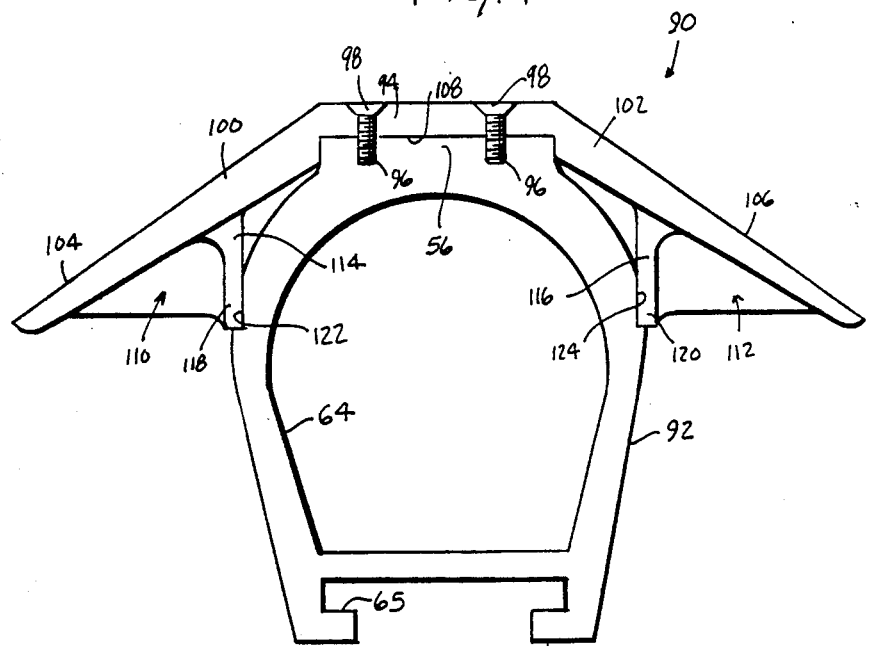
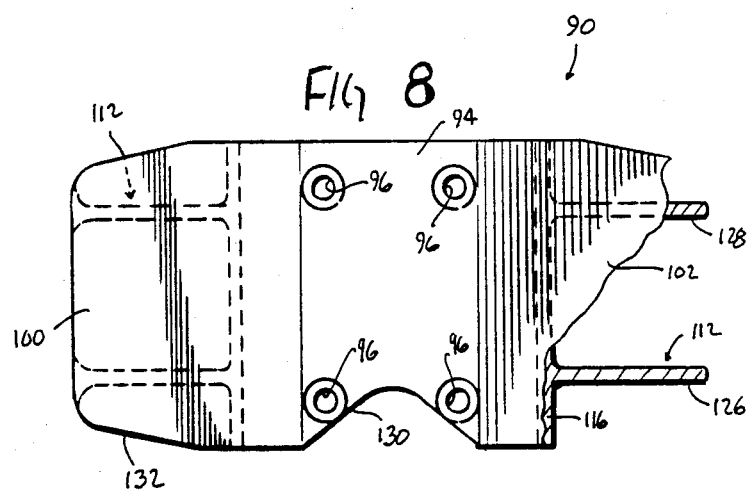

AIRCRAFT MISSILE LAUNCHER SWAY BRACE APPARATUS

RELATED APPLICATION

This is a continuation-in-part of U.S. Pat. No. 4,736,669 entitled "Aircraft Missile Launchers Mounting Apparatus", by Kenneth R. Long et al., Ser. No. 017,777, filed Feb. 20, 1987, now U.S. Pat. No. 4,736,669.

TECHNICAL FIELD OF THE INVENTION

The present invention relates in general to missile launchers, and more particularly relates to apparatus for adapting missile launchers to fit different types of aircraft.

BACKGROUND OF THE INVENTION

Missiles are generally not mounted directly to an aircraft, but rather are mounted to launchers which are fixed to the aircraft. In this manner, the missile can be launched from the launcher, while the launcher remains fixed to the aircraft. Conventional missile launchers include a rail structure for holding a missile, and electromechanical apparatus for fixing the missile to the launcher during aircraft take-offs and landings. A release mechanism arms the missile and releases it for launching. Power supply equipment is also housed within the launcher for controlling the fusing and firing of the missile, and in the heat seeking type of missiles, equipment for interconnecting a source of compressed nitrogen to the missile for an infrared detector.

Missiles are generally adapted for launching from different types of aircraft, and thus the associated launcher must be adapted to fit many types of aircraft. Aircraft bomb racks and pylons are typical of structures for attachment of missile apparatus to the aircraft. Military aircraft bomb racks have hooks with mounting centers typically of fourteen inches or thirty inches. Aircraft pylon mounting structures comprise studs or threaded holes which are spaced apart about thirty inches. In the case of Sidewinder missiles, adapters have been provided for mounting a missile launcher to the bomb racks.

In order to accommodate both types of mounting centers, the adapter includes sway braces for preventing angular or rotational movement of the launcher and attached missile when fixed to the aircraft. The sway braces comprise large flat areas extending laterally on each side of the adapter which abut with adjusting bolts in aircraft outrigger apparatus. When properly adjusted, any launcher wobble about the mounting centers is eliminated. Such an adapter is identified as ADU-299A/A. While this launcher adapter is operable to fix missile launchers to various types of aircraft, it is expensive, adds weight to the load of the aircraft, and extends the missile further away from the aircraft. The adapter itself, as well as the spacing of the missile further from the wing, affects the aerodynamic efficiency of the aircraft.

While not commercialized, sway braces have been previously developed for attachment to desired positions along the body of a missile launcher. According to one type of sway brace developed by Frazer-Nash, Ltd., Randalls Way, Leatherhead, Surrey, United Kingdom, a longitudinal T-slot was formed along the top surface of the launcher. A small sway brace with a T-protrusion could be placed in the slot and adjusted to desired positions along the body of the launcher to accommodate different types of bomb racks. In another version, a plurality of individual T-slots were cut down into the body of the launcher. Sway braces with T-protrusions could then be dropped into the desired T-slots.

From the foregoing, it can be seen that a need exists for improved missile launcher apparatus which is less costly, more compact, adaptable to various bomb rack spacings, and which prevents any sway or wobble of the launcher and attached missile.

SUMMARY OF THE INVENTION

In accordance with the present invention, the disclosed missile launcher apparatus reduces or substantially eliminates the disadvantages and shortcomings of the associated prior art launchers and associated adapters. In accordance with the invention, the missile launcher itself is constructed for mounting directly to different types of bomb racks or pylons without an intervening adapter. A number of small lateral sway braces can be located at desired positions along the launcher to accommodate a variety of bomb rack outrigger equipment.

In the preferred embodiment of the invention, the body of the missile launcher is formed with an elongate top planar surface to provide sufficient rigidity of the launcher for the cantilever suspension thereof when mounted at the fourteen inch centers to the aircraft. Plural spaced apart threaded holes in the planar surface are adapted for receiving corresponding threaded suspension lugs which are fixed to the bomb racks. Other holes allow the launcher to be fixed to aircraft pylon mountings.

A saddle-type of sway brace is fastened to the planar surface of the launcher at desired locations to provide abutting surfaces for the outrigger equipment of the aircraft. Preferably, a fore and aft saddle sway brace can accommodate most types of aircraft.

The saddle sway brace is unitary in construction, having a top plate which spans the planar surface and provides the structure for fixing the sway brace to the launcher body. Formed integral with the top plate are angled plate structures which are disposed on opposing sides of the launcher. The upper surfaces of the angled plate structures provide engaging surfaces for the aircraft outrigger equipment. Formed on the bottom surface of each angled plate are webbed support structures which provide a reinforcing support between the saddle sway brace and the missile launcher. The missile launcher has formed on each lateral side of the body thereof a notch or recessed area for receiving therein an edge of the webbed structure. With such a construction, the saddle sway brace can support extremely heavy loads, while yet being light weight and easily removable.

The saddle sway braces can be moved to any longitudinal position along the launcher body, and fixed thereto by fasteners to accommodate the positional constraints of different aircraft outrigger equipment.

BRIEF DESCRIPTION OF THE DRAWINGS

Further features and advantages will become more apparent from the following and more particular description of the preferred embodiment of the invention, as illustrated in the accompanying drawings in which like reference characters generally refer to the same parts throughout the views, and in which:

FIG. 7 is a sectional view of a missile launcher with a saddle-type of sway brace fixed thereto; and FIG. 8 is a partially sectioned top view of the saddle sway brace of FIG. 7.

DETAILED DESCRIPTION OF THE INVENTION

Figure 1:
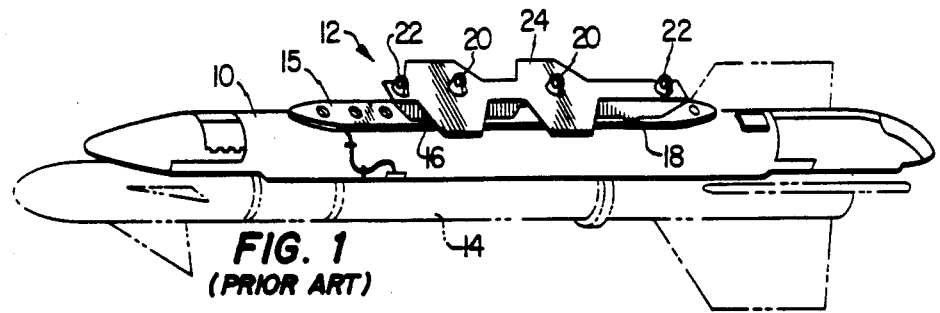
FIG. 1 is an isometric view of a launcher outfitted with a missile, and with a conventional adapter assembly.

FIG. 1 illustrates a well-known launcher 10 and adapter assembly 12 for allowing the launcher 10 to be fixed to fourteen or thirty inch mounting center bomb racks (not shown). A missile 14 is shown in broken lines, in the position normally attached to the launcher 10. The launcher 10 is constructed with an elongate channel or guide rail on the bottom side thereof. The missile 14 includes a mating flange for slidable insertion into the guide rail. In this manner, the missile 14 can be attached to the launcher 10, and launched by being thrust out of the guide rail by its rocket.

Conventional LAU 7/A launchers 10 are constructed with thirty inch mounting centers as generally indicated by reference characters 16 and 18. When the launcher is mounted to aircraft types with thirty inch pylon mountings, the launcher 10 is fixed directly to the aircraft in abutment with the top planar platform surface 15. Threaded fasteners fix the launcher 10 to the aircraft pylons at points 16 and 18. With mating flat mounting surfaces between the pylon and the launcher 10 there is no sway, and thus the adapter 12 is not needed.

The adapter assembly 12 is provided with suspension lugs 20 spaced fourteen inches apart for use with aircraft having fourteen inch bomb racks. Suspension lugs 22 are spaced apart thirty inches to accommodate bomb rack hooks which are spaced thirty inches. When the adapter 12 is used, it is mounted to the missile launcher 10 at the thirty inch fastening locations 16 and 18. Thus, the missile launcher 10 constructed with thirty inch mounting centers can be fixed to fourteen or thirty inch bomb racks by the use of the adapter assembly 12.

The adapter assembly 12 includes four large-area flanges 24 which function as sway braces engageable with bomb rack equipment. Because different bomb racks are equipped with various outrigger abutting equipment at different locations, the sway braces 24 of the adapter assembly 12 are purposely made with extra large areas to universally accommodate the different types of bomb racks. Attached to each side of a conventional bomb rack are two outriggers, with a threaded hole in each such outrigger. A threaded rod with a swivel foot is screwed into the outriggers and adjusted to bear down on the launcher sway brace, thereby providing antisway support to the launcher and missile.

The adapter assembly 12 weighs about thirty pounds and is extremely expensive. In addition, the adapter assembly is about four inches high, thereby fixing the launcher 10 and missile 14 in a lower position under an aircraft wing. The aerodynamics of the aircraft are affected accordingly.

Figure 2:
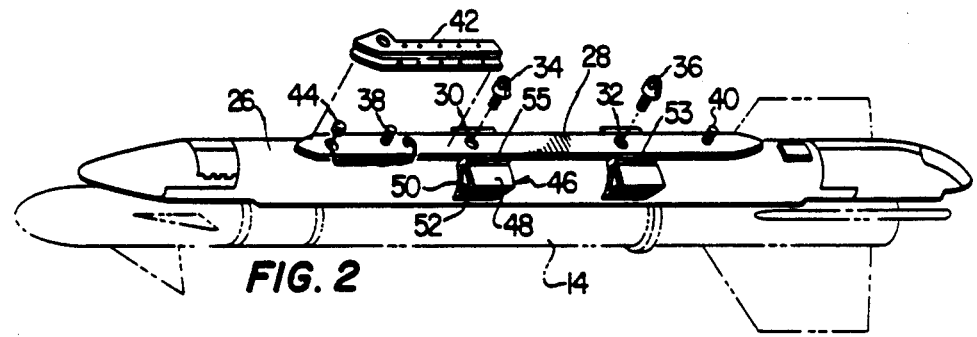
FIG. 2 is an isometric view of a missile launcher and sway brace embodiment constructed in accordance with the invention, and including a missile shown in broken lines.

FIG. 2 illustrates a launcher 26 and associated sway brace equipment. The general body of the launcher 26, as well as the internal missile launching equipment is substantially the same as that of the well-known launcher 10 of FIG. 1. The launcher 26 is constructed with an elongate planar platform top surface 28 which extends along the top surface of the body of launcher 26. The platform surface 28 is constructed of extruded aluminum material, and formed integral with the tubular body of the extruded aluminum launcher 26. Formed within the platform surface 28 are spaced apart threaded holes 30 and 32 for securement therein by a pair of corresponding bomb rack suspension lugs 34 and 36. The threaded holes 30 and 32 are spaced apart fourteen inches to accommodate one style of aircraft bomb rack. Also formed in the platform surface 28 are a pair of spaced apart pylon mounting lugs 38 and 40, also threaded into the platform surface 28. The pylon mounting lugs 38 and 40 are spaced apart thirty inches to accommodate another style of aircraft pylon mountings. As can be appreciated, various other threaded holes can be formed in the platform surface to accommodate various other styles of aircraft bomb racks or pylon mounting equipment.

The planar platform surface 28 is about 2.38 inches wide and about five feet long. The platform 28 extends above the surface of the launcher body 26 about five-eighths inch to provide side edges. As can be seen, the elongate platform 28 provides additional rigidity to the launcher 26 which is required, especially when the launcher 26 is mounted by the fourteen inch center suspension lugs 34 and 36. The platform surface 28 supplies additional strength to the launcher for the cantilever suspension thereof, as well as the missile 14 which is fixed thereto.

A sheet metal cable cover 42 can be installed over the platform surface 28 to shield an electrical cable 44 which carries signals and power between the aircraft and the missile launcher 26.

A number of sway braces, such as 46, are mounted at desired positions on opposing sides of the platform surface 28 to provide in-flight antisway capabilities of the launcher 26 when fixed to an aircraft bomb rack. The sway brace 46 includes an upper generally flat surface 48 and a lower curved surface 50 for engaging the cylindrical body shape of the launcher 26. The sway brace 46 can also be hollowed 52 to reduce the weight thereof. Each sway brace 46 further includes a flanges 55 with holes therein spaced identical to the spacing of corresponding threaded holes formed in each side edge of the platform surface 28. A pair of screws or bolts 66 can then be inserted through the sway brace holes (not shown) and secured at a desired longitudinal position of the launcher platform 28.

When the sway braces 46 are secured to the launcher as described above, bomb rack adjustment screws or other equipment are adjusted to bear down upon the top surface 48 of each brace 46. The curved bottom surface of each brace is flush against the body of the launcher 26, and therefore the braces 46 function as wedges between the aircraft and the tubular launcher 26 to prevent angular movement or other sway tendencies.

Because of the adjustable nature of the sway braces 46 along the longitudinal length of the launcher 26, such braces can be made smaller in size, but yet accommodate bomb racks with different types of outriggers. Smaller sway braces also reduce the weight and cost of the launcher.

Figure 3:
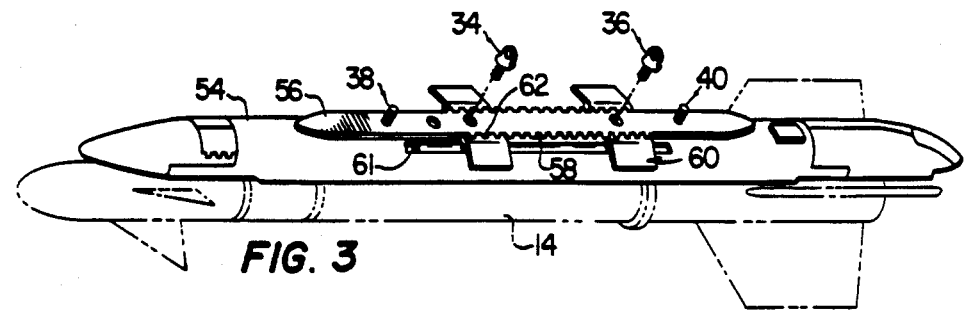
FIG. 3 is an isometric view of a missile launcher and sway brace constructed in accordance with a second embodiment of the invention.

FIG. 3 illustrates another embodiment of the missile launcher and corresponding sway braces. The missile launcher 54 of this embodiment includes a rigidizing platform 56 similar to that shown in FIG. 2, but with dovetail mortises 58 formed in the platform side edges. Each sway brace 60 has formed in an edge thereof corresponding dovetail tenons 62 for engagement with the platform mortises 58. The dovetail mortises 58 and tenons 62 are evenly spaced so that the sway brace 60 can be engaged at plural positions along platform 56 of the launcher 54. While not shown in FIG. 3, each sway brace 60 includes a curved foot which fits within a recess 61 in the body of the launcher. The curved foot is fastened by a bolt or screw to the missile launcher body.

Figure 4:
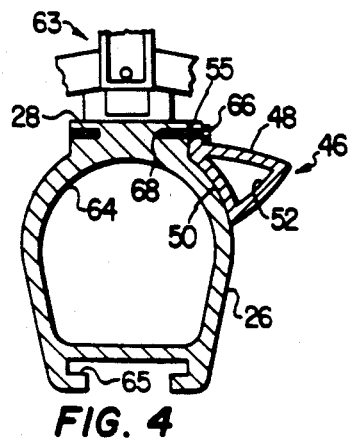
FIG. 4 is a partial sectional view of the launcher of FIG. 2, showing the engagement of the sway brace therewith.

FIG. 4 is a more detailed cross-sectional illustration of the sway brace 46 of FIG. 2, as mounted to the missile launcher 26. Conventional bomb rack equipment is shown generally as numeral 63. The missile launcher 26 is generally cylindrical in shape having an internal elongate cavity 64 for housing the launcher electromechanical equipment identified above. A guide slot 65 extends essentially along the length of the launcher 26 for slideably holding the missile (not shown). The sway brace 46 is formed with an insider curved surface 50 for uniform engagement with the outer curved surface of the missile body 26. The upper abutting surface 48 of the sway brace 46 is shown somewhat curved, but can be formed flat, or with other desired curvatures. A bolt 66, or other suitable fastener, can be inserted into the hole of the sway brace flange 55 and secured into the threaded hole 68 formed in the side edge of the platform surface 28. Each sway brace 46 can be secured using two or more bolts 66. The sway brace 46 can be made with a cavity 52 therethrough to reduce the weight thereof. In practice, a pair of sway braces mounted on each side of the platform surface 28 provides sufficient antisway capability to the launcher 26 and attached missile 14.

Figure 5:
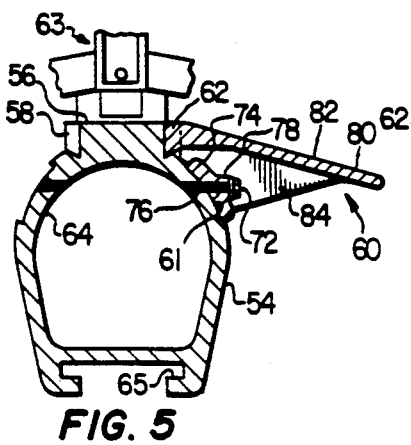
FIG. 5 is a partial sectional view of the launcher of FIG. 3, showing the engagement of the sway brace therewith.

FIG. 5 is a sectional view illustrating another embodiment of the launcher 54 and associated sway brace 60. The launcher platform 56 includes the dovetail mortises 58 formed in the opposing side edges thereof so that the sway brace dovetail tenons 62 can be inserted therein by lowering the sway brace 60 downwardly toward the launcher platform 56. When the dovetail mortises 58 and tenons 62 are fully engaged, the sway brace 60 is fixed to the launcher 54. Because of the loads imposed on the sway brace 60 due to the bomb rack outrigger equipment, a recess or step 61 is formed within the body of the launcher 54 for receiving therein the curved foot 74. The bottom edge of the recess 61 abuts with the bottom edge of the curved foot 74 and thereby provides support for load forces on the sway brace. As an alternative, the recess 61 can be eliminated and a ridge formed on the body of the launcher 54 for abutment with the bottom edge of the sway brace foot 74. The sway brace embodiment of FIG. 2 can be similarly supported.

For added security, a bolt 72 is fastened through the curved foot 74 into a threaded hole 76 formed within the side of the launcher body 54. Plural threaded holes 76 are formed along the side of the launcher body. The provision of the bolt attachment assures that the sway brace will remain attached to the launcher in the event the launcher and attached missile are jettisoned from the aircraft. If the sway braces were to become separated from the launcher in such an event, they could be ingested within an aircraft engine and destroy the aircraft. The curved foot 74 has formed thereon a boss 78 for abutment with the bolt head when secured within the missile body 54. The sway brace 60 has a top plate 80 with an angled planar surface 82 for abutment with aircraft outrigger equipment (not shown). A reinforcing web 84 is formed between the top plate 80 and the curved foot 74.

Figure 6:
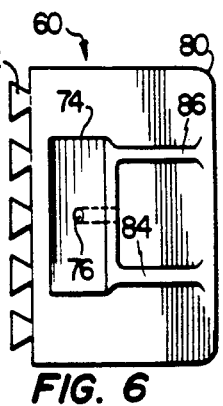
FIG. 6 is a bottom view of a sway brace constructed in accordance with the invention of FIG. 5.

FIG. 6 is a bottom view of the sway brace embodiment of FIG. 5. While the curved foot 74 is shown shortened with respect to the length of the sway brace 60, the foot 74 may be extended in length to provide additional engagement with the curved surface of the missile launcher 54. Also, a pair of support webs 84 and 86 are shown formed integral with the curved foot 74 and the top plate 80. The sway brace 60 can be cast from aluminum. Because of the construction of sway brace 46, it can be extruded from aluminum or other suitable material.

FIG. 7 is a sectional view of a saddle-type sway brace 90 constructed in accordance with the invention. According to this embodiment, the saddle-type sway brace 90 rests atop a modified missile launcher 92 for providing support to aircraft outrigger equipment, as described above. More specifically, the saddle sway brace 90 includes a top plate 94 having holes 96 therein for fastening by screws 98 to the platform 56 of the launcher 92. The platform 56 has a number of threaded holes 97 for receiving the fastening screws 98. Formed integral with the top plate 94 are angled plates 100 and 102 having upper planar surfaces 104 and 106 for supporting the noted outrigger equipment. In the preferred form of the invention, the angled plates 100 and 102 form an angle of about 30° with respect to a horizontal plane. With such a construction, the sway brace 90 straddles the missile launcher 92, much like a saddle structure.

The saddle sway brace 90 has formed on an under surface thereof a channel 108 extending the entire longitudinal length thereof. The channel 108 is formed with dimensions for receiving therein the launcher body platform 56. The close-fit engagement between the saddle sway brace 90 and the platform 56 prevents lateral movement of the noted structures, and thus stability of one part with respect to the other. The saddle sway brace 90 can be easily located on the top surface of the launcher body platform 56, and slid therealong until the holes 96 in the top plate 94 are aligned with corresponding threaded holes 97 in the platform 56. On such an alignment, the screws 98 can be easily fastened into the missile launcher body 92, thereby fixing the parts firmly together.

Also formed integral on the underside of each angled plate 100 and 102 is a respective reinforcing webbed network 110 and 112. The webbed network 110 and 112 provides reinforcement for the respective angled plates 100 and 102 which support heavy loads thereon. In addition, the webbed networks 110 and 112 include respective vertical support members 114 and 116, each having a elongate bottom edge 118 and 120. The bottom edge 118 and 120 of each such vertical support member 114 and 116 fits within a respective notch 122 and 124 formed within the opposing sidewalls of the missile launcher body 92. As noted from FIG. 7, the notches 122 and 124 are cut, machined or otherwise formed into the side surfaces of the launcher body 92 and provide a ledge or corner for receiving therein the respective bottom edge 118 and 120 of the vertical support member 114 and 116. Thus, the webbed networks 110 and 112 function also to provide vertical and lateral support for the angled plates 100 and 102 for facilitating the support of heavy loads thereon. As can be appreciated, the saddle sway brace 90 must withstand the loads exerted thereon by the aircraft outrigger equipment when the aircraft experiences large G forces during combat maneuvers.

In accordance with the preferred embodiment of the invention, the saddle sway brace 90 is forged from an aluminum material to provide a light weight and high strength article. Typically, a pair of such sway braces 90 would be mounted atop the missile launcher 92 to provide sway stability at fore and aft positions.

With regard to FIG. 8, there is depicted a partially sectioned top view of the saddle sway brace 90. With regard to the webbed network 112, there is illustrated a pair of reinforcing members 126 and 128, each connected to the vertical support member 116 for providing reinforcement to the angled plate 102. The vertical support member 116 extends substantially the entire longitudinal length of the sway brace 90, as does the channel 108 formed on the undersurface of the top plate 94. The other webbed network 110 is similarly constructed with respect to angled plate 100.

Formed in the top plate 94 is a cutout portion 130 for providing access to missile launcher equipment, such as pylon or bombrack support structures. With such a cutout 130, the saddle sway brace 90 can be fixed to existing missile launchers having previously formed therein the threaded holes in the top platform 56. The angled plates 100 and 102 are also constructed having tapered corners, such as shown by reference character 132.

From the foregoing, an improved sway brace is disclosed, and adapted for mounting in a straddled position to various types of missile launchers. The saddle-type sway brace includes a channeled top plate with opposing angled plates for supporting aircraft outrigger equipment. A webbed network formed integral with the angled plates is engageable with the body of the missile launcher to provide additional support to loads.

While the preferred embodiments of the invention have been disclosed with reference to a specific missile launcher, and a method of fabrication thereof, it is to be understood that many changes in detail may be made as a matter of engineering choices without departing from the spirit and scope of the invention, as defined by the appended claims.

What is claimed is:

1. A saddle sway brace for use with an aircraft missile launcher, comprising:
   a saddle arrangement removably fixed over the launcher, and including a pair of planar surfaces, each disposed on opposing sides of the launcher for abutting with aircraft apparatus, and means for removably fixing the saddle sway brace to the launcher; and
   further including a pair of support feet, each fixed to an under surface of the saddle sway brace for engagement with a respective opposing side surface of the missile launcher.

2. The sway brace of claim 1, further including a webbed reinforcing arrangement defining each said support foot.

3. A saddle sway brace for use with an aircraft missile launcher, comprising:
   a saddle arrangement removably fixed over the launcher, and including a pair of planar surfaces, each disposed on opposing sides of the launcher for abutting with aircraft apparatus;
   means for removably fixing the saddle sway brace to the launcher; and
   a top planar section and angled planar sections fixed on opposing side edges of said top planar section.

4. The sway brace of claim 3, wherein said top planar section includes a plurality of holes for fixing said saddle sway brace with fasteners to the missile launcher.

5. A saddle sway brace for use with missile launcher equipment, comprising:
   a rigid arrangement having a top planar section with holes therein for fixing the sway brace to a missile launcher;
   a first and second planar plates formed integral with respective opposing side edges of said top planar section, each said planar plate being angled with respect to said top planar section; and
   a webbed reinforcing network formed on the under surface of each said angled planar plate, one edge of said webbed reinforcing network of each said angled plate being effective to engage a side surface of the missile launcher and provide support to said sway brace.

6. The saddle sway brace of claim 5, further including a recessed area formed on the under surface of said top planar section for receiving therein a part of said missile launcher to thereby prevent lateral movement.

7. The saddle sway brace of claim 5, wherein said edge of said webbed network extends the entire length of said sway brace.

8. A missile launcher of the type adapted for attachment to an aircraft, comprising:
   an elongate body defining a housing of said launcher;
   a ledge formed on opposing side surfaces of said launcher body;
   a saddle sway brace fittable over the top of said launcher so as to extend on each side thereof, said saddle sway brace including wings, each extending on each side of said launcher body and angled downwardly for providing a planar surface for abutting with aircraft apparatus, and including support feet fixed on the under surface of each said angled wing and engageable with a respective said ledge; and
   means for removably fixing said sway brace to said launcher body.

9. The missile launcher of claim 8, wherein said launcher body includes a platform extending along the top surface of said launcher body, and said sway brace includes a channel for receiving therein said platform to prevent lateral movement of said sway brace with respect to the launcher body.

10. The missile launcher of claim 9, further comprising reinforcing support webs on the underside of said wings wherein said support web includes an elongate edge engageable within said ledge.

* * * * *